Oct. 30, 1928.

J. R. C. SMITH 1,689,304

INTERNAL COMBUSTION ENGINE CYLINDER HEAD

Filed April 20, 1927

Inventor.
J. R. C. Smith

Patented Oct. 30, 1928.

1,689,304

UNITED STATES PATENT OFFICE.

JOHN REGINALD CRISPIN SMITH, OF VICTORIA, BRITISH COLUMBIA, CANADA.

INTERNAL-COMBUSTION-ENGINE CYLINDER HEAD.

Application filed April 20, 1927. Serial No. 185,293.

My invention relates to improvements in internal combustion engine cylinder heads in which the combustion chamber, separated from the cylinder by a passage, is dome shaped, and the inlet valve is in the cylinder above the piston, and the exhaust valve is in the combustion chamber; and the objects of my improvement are, first, to obtain power, economy and non-detonating firing by the new semi-spherical shape of the combustion chamber which gives great turbulence, second, to provide large valve area with compact construction and freedom from confined pockets as with a large valve area the lift of the valve can be reduced giving freedom from noise and vibration and economy of operation. third, to give unrestricted flow to the exhaust gases, fourth, to so place the inlet valve that unvaporized particles of the gasoline would be deposited on its outer face between each opening of the valve and vaporized by the next charge, fifth, to permit inexpensive machining of most of the combustion chamber on account of its shape, sixth, to prevent the inlet valve being heated by the most intense heat of the combustion.

I attain these objects by the design illustrated in the accompanying drawings, in which:—

Figure 1:
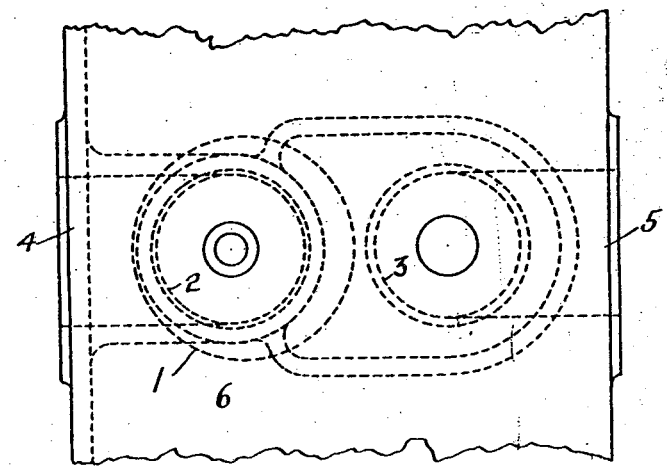
Figure 2:
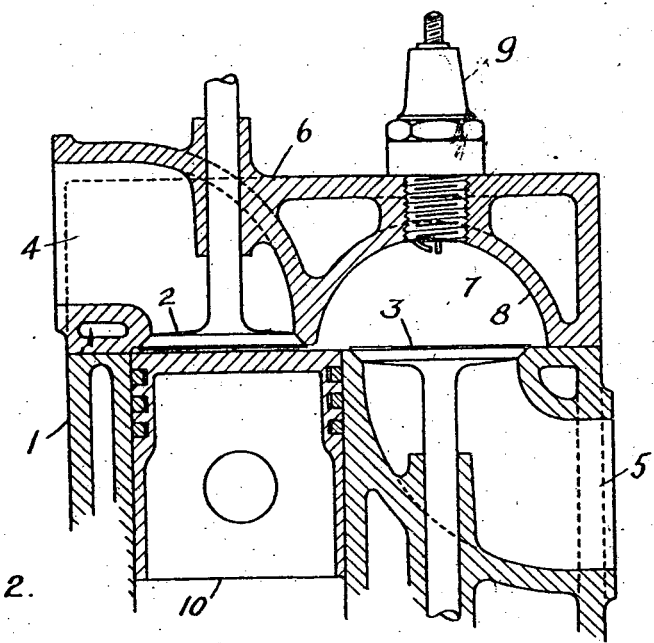

Fig. 1 is a plan view of the cylinder head in position on the cylinder block. Fig. 2 is a vertical section of the cylinder and cylinder head of an internal combustion engine of this improved design.

Similar numerals refer to similar parts throughout the two views.

The cylinder 1 is cooled by water circulating in passages provided, and the cylinder has at one side thereof the valved exhaust passage 5 in which is the exhaust valve 3. The cylinder head 6 is cooled by water circulating in passages provided therein and is a separate part from the cylinder block and adapted to be suitably attached to the cylinder block. The head has integral with it the valved inlet passage 4 in which is the inlet valve 2, and the semi-spherical combustion chamber 7, the walls 8 of which are arched into a semi-circular form, one side being formed to follow the bore of the cylinder and overlapping to provide a passage for the mixture to pass between the combustion chamber and the cylinder. A spark plug 9 is mounted in the dome of the combustion chamber 7. The construction of the cylinder block and cylinder head is such that the least possible clearance space exists between the piston 10 and the inlet valve 2. The top of the piston 10 being level with the top of the cylinder wall at the top of the stroke.

I am aware that prior to my invention internal combustion engines have been made with a separate combustion chamber to one side of the cylinder with a passage thereto and with small clearance between the top of the stroke and the cylinder head. I therefore do not claim such a combination broadly; but

I claim:

In an internal combustion engine, a cylinder, a piston operative in the cylinder, a dome-shaped combustion chamber offset from the plane of the cylinder, said combustion chamber including a base substantially in line with the upper end of the cylinder and a curved upper wall which extends to and in part inwardly overlies the wall of the cylinder, whereby to provide a communication between the cylinder and combustion chamber opening directly into said chamber, an inlet gas passage leading to the cylinder, an inlet valve controlling the passage and directly overlying the cylinder, said inlet valve having a diameter greater than half the diameter of the cylinder, an exhaust valve in the base of the combustion chamber having a diameter greater than half the diameter of the cylinder, the communication between the combustion chamber and cylinder being less than half the transverse sectional area of the cylinder to give turbulence to the firing charge, and a spark plug arranged in the dome of the combustion chamber.

JOHN REGINALD CRISPIN SMITH.